United States Patent
Lee et al.

(10) Patent No.: US 7,227,796 B2
(45) Date of Patent: Jun. 5, 2007

(54) MEMORY SYSTEM MOUNTED DIRECTLY ON BOARD AND ASSOCIATED METHOD

(75) Inventors: Jung-Bae Lee, Kyungki-do (KR); Hoe-Ju Chung, Kyungki-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 19 days.

(21) Appl. No.: 10/750,093

(22) Filed: Dec. 31, 2003

(65) Prior Publication Data
US 2004/0221186 A1   Nov. 4, 2004

(30) Foreign Application Priority Data
May 2, 2003   (KR) ............... 10-2003-0028175

(51) Int. Cl.
*G11C 5/02* (2006.01)
(52) U.S. Cl. ............... 365/198; 365/51; 365/63; 365/230.08; 365/233
(58) Field of Classification Search ............... 365/51, 365/63, 230.08, 198, 233
See application file for complete search history.

(56) References Cited

U.S. PATENT DOCUMENTS

| | | | |
|---|---|---|---|
| 5,321,664 A * | 6/1994 | Akimoto ............... 365/230.03 |
| 5,650,757 A | 7/1997 | Barber ............... 333/128 |
| 5,896,346 A | 4/1999 | Dell et al. ............... 365/233 |
| 6,034,878 A | 3/2000 | Osaka et al. ............... 365/52 |
| 6,229,727 B1 | 5/2001 | Doyle ............... 365/63 |
| 6,414,868 B1 | 7/2002 | Wong et al. ............... 365/51 |
| 6,519,173 B2 | 2/2003 | Funaba et al. ............... 365/63 |
| 6,917,546 B2 * | 7/2005 | Matsui ............... 365/198 |
| 2002/0161968 A1 * | 10/2002 | Yoo et al. ............... 711/105 |
| 2003/0081444 A1 | 5/2003 | Cordes et al. ............... 365/96 |

FOREIGN PATENT DOCUMENTS

| | | | |
|---|---|---|---|
| DE | 2004022347 A1 * | 12/2004 |
| JP | 2004334879 A * | 11/2004 |
| KR | 10-20020066381 | 8/2002 |

OTHER PUBLICATIONS

English language abstract of Korean Publication No. 10-20020066381.
"Sinclair ZX81", http://de.wikipedia.org/wiki/Sinclair_ZX81, Nov. 10, 2005, pp. 1-4.

* cited by examiner

*Primary Examiner*—Andrew Q. Tran
(74) *Attorney, Agent, or Firm*—Marger Johnson & McCollom, P.C.

(57) ABSTRACT

The invention provides an improved memory system that addresses signal degradation due to transmission line effects. The improved memory system includes a first buffer, at least one first memory device coupled to the first buffer, and a plurality of signal traces. The first buffer and memory device are mounted on a motherboard. Likewise, the plurality of signal traces is routed on the motherboard. Doing so eliminates stub loads that cause signal reflection that, in turn, result in signal degradation.

13 Claims, 8 Drawing Sheets

MEMORY SYSTEM MOUNTED DIRECTLY ON BOARD AND ASSOCIATED METHOD

This application claims priority from Korean patent application number P2003-28175 filed May 2, 2003 that we incorporate herein by reference.

BACKGROUND OF THE INVENTION

1. Field of the Invention

The present invention relates to an improved memory system mounted directly on a motherboard and an associated method.

2. Description of the Related Art

Most computer systems allow for memory expansion using memory modules. Memory modules—for example, single inline memory modules (SIMMs) and/or dual inline memory modules (DIMMs)—are small, compact circuit boards that are designed to connect easily into an expansion socket mounted on a main circuit or motherboard.

FIGS. 1 and 2 are diagrams of computer system 100's memory architecture. Referring to FIGS. 1 and 2, a system 100 includes a plurality of memory modules 106 controlled by a memory controller 104. The memory controller 104 controls read and write operations relating to the memory modules 106. The memory controller 104 is mounted on the main or motherboard 102. The operation of the memory controller 104 is well known to a person of reasonable skill in the art and will not be discussed any further.

The memory modules 106 oftentimes include edge connectors 114 comprising a plurality of contact pads 116. The contact pads 116 are typically present at both sides of the modules 106. A plurality of receptacles, e.g., sockets 112, is mounted on the motherboard 102. The sockets 112 receive the edge connectors 114 to thereby electrically couple the motherboard 102 to the memory modules 106. More particularly, the sockets 112 electrically couple traces routed on the motherboard 102 to traces routed on the memory modules 106.

The memory modules 106 include a plurality of memory devices 108. These memory devices 108 are, for example, dynamic random access memory (DRAM) or synchronous dynamic random access memory (SDRAM). A buffer 110 controls and buffers commands and addresses (C/A) it receives from the memory controller 104. The plurality of memory devices 108 and the C/A buffer 110 are mounted on the memory module 106.

Signal traces are routed on both the motherboard 102 and the modules 106. These signal traces might include a data bus DQ, system clock signal CLK, and C/A bus. The memory devices 108 and the buffer 110 receive signals from a controller 104 through the corresponding socket 112 mounted on the motherboard 102.

In any memory architecture, it is important to maintain the signal integrity of the address, control and clock signals. Maintaining signal integrity becomes more difficult as the operating frequency increases because of transmission line effects, including signal reflection.

In transmission line theory, the connection between the motherboard 102 and the module 106 through the socket 112 is termed a stub load. Stub loads present a transmission discontinuity that results in signal reflection and ultimately, adversely affects signal integrity.

Referring to FIGS. 1–3, a signal trace 302, e.g., the data bus DQ, is routed on the motherboard 102. The signal trace 302 is electrically coupled to a signal trace 304 routed on the module 106 through the socket 312. But the socket 312 presents a discontinuity 306 between the signal trace 302 and the signal trace 304. The discontinuity 306 causes a portion of the signal to reflect back injecting noise, as well as, decreasing timing margins and voltage windows.

Referring to FIG. 4, stub resistors 416 in the memory modules 406 reduces signal reflection. But these stub resistors 416 improve memory read and write operations. As the value of the stub resistors 416 increases to decrease reflection, the voltage drop across it increases attenuating the signal voltage. Attenuating signal voltages decrease the voltage window. And the stub resistors 416 might cause RC parasitic loads that delay the signal.

Accordingly, a need remains for a memory system capable of addressing disadvantages associated with existing memory systems.

BRIEF DESCRIPTION OF THE DRAWINGS

The foregoing and other objects, features, and advantages of the invention will become more readily apparent from the detailed description of an embodiment that references the following drawings.

DETAILED DESCRIPTION OF THE PREFERRED EMBODIMENT

Figure 5:
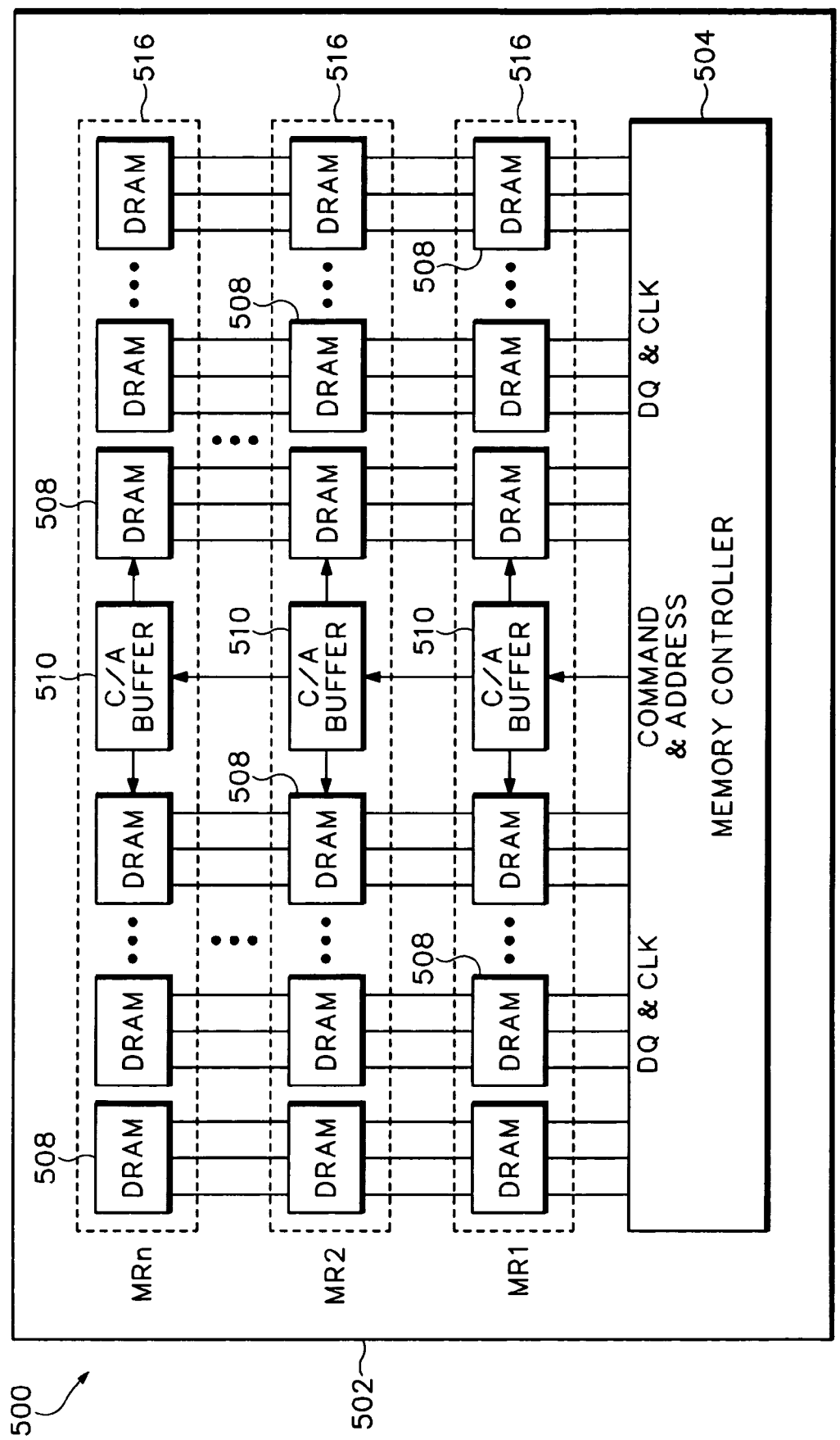
FIG. 5 is a top view of an embodiment of the memory system according to the present invention.
Figure 6:
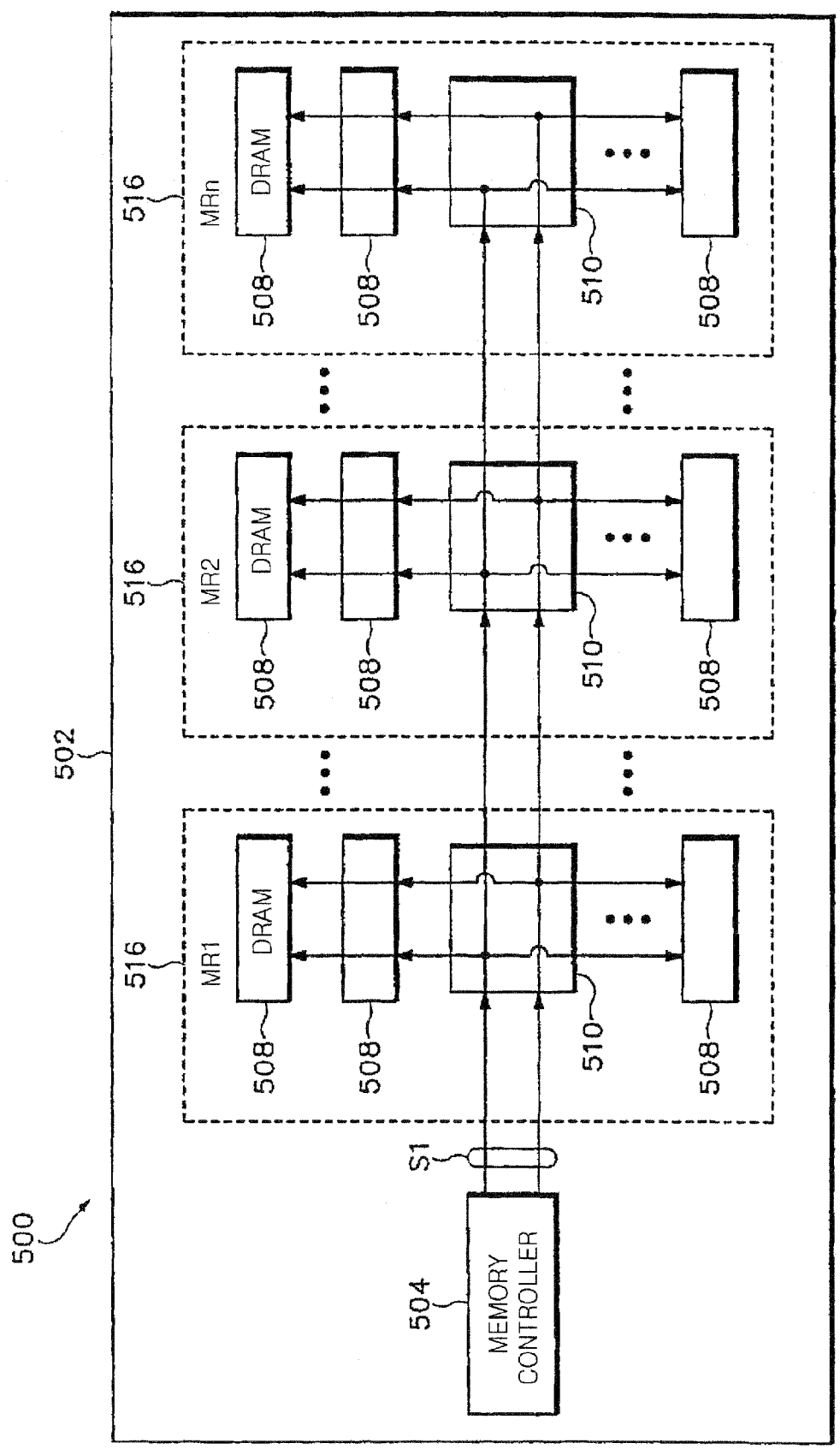
FIG. 6 is a block diagram of the memory system shown in FIG. 5.

FIG. 5 is a top view of a memory system according to the present invention. FIG. 6 is a block diagram of the memory system shown in FIG. 5. Referring to FIGS. 5 and 6, the memory system 500 includes a memory controller 504 that controls a plurality of memory ranks 516. The memory controller 504 controls read and write operations relating to the memory ranks 516. The memory controller 504 is mounted on the motherboard 502. The structure and operation of the memory controller 504 is well known to a person of reasonable skill in the art and will not be discussed any further.

The plurality of memory ranks 516 is mounted directly on the motherboard 502. That is, there is no separate memory module 106 as exists in the system 100.

Each memory rank includes a plurality of memory devices 508 coupled to a buffer 510. The memory devices 508 are directly mounted on the motherboard 502. Each memory device 508 is, for example, a DRAM or SDRAM. The structure and operation of the memory devices 508 is well known to a person of reasonable skill in the art and will not be discussed any further.

The buffer 510 controls and buffers commands and addresses it receives from the 30 memory controller 504.

The buffer 510 might be a command and address buffer. The buffer 510 is mounted to the motherboard 502. The buffer 510 might include inverters, drivers, and the like to allow it to drive the plurality of memory devices 508 with the command and address signals it receives from the controller 504. The structure and operation of the buffer 510 is well known to a person of reasonable skill in the art and will not be discussed any further.

Signal traces are routed on the motherboard 502. These signal traces might include a data bus DQ, system clock signal CLK, and command and address bus C/A as shown in FIGS. 5 and 6.

The system 500 operates as follows. The controller generates command and address signals it transmits to the command and address buffer 510 via signal traces routed on the motherboard 502. The plurality of memory devices 508 receive data signals DQ and the system clock signal CLK from the controller 504 or other circuitry on the motherboard not shown in FIGS. 5 or 6. If the command signals indicate a read operation, the memory device 508 will provide the data read from the corresponding memory cell indicated by the address signals responsive to the system clock CLK. If the command signals indicate a write operation, the memory device 508 will write the data to the corresponding memory cell indicated by the address signals responsive to the system clock CLK.

The system 500 eliminates stub loads that cause signal reflection by eliminating memory modules. If there are no memory modules, then there is no need for sockets that create transmission line discontinuities. If there are no transmission line discontinuities, then no signal reflection can exist that degrade its integrity in the manner we discussed above.

Figure 7:
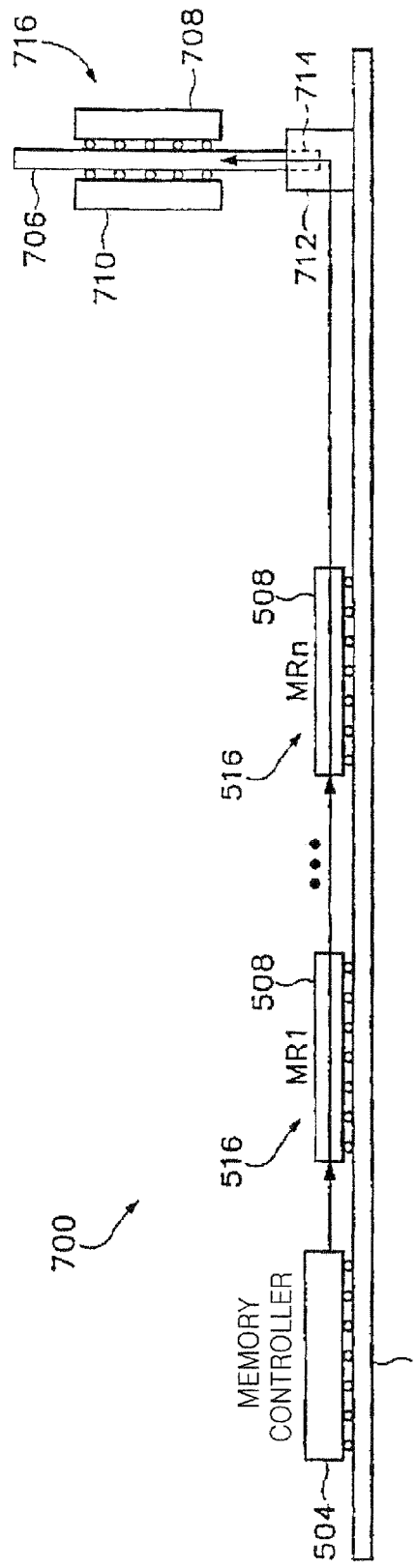
FIG. 7 is a side view of an embodiment of the memory system according to the present invention.

FIG. 7 is a side view of a memory system 700 according to the present invention. Referring to FIG. 7, the system 700 includes the plurality of memory ranks 516 and the controller 504 discussed earlier with reference to FIGS. 5 and 6. The plurality of memory ranks 516 and the controller 504 are mounted on the motherboard 502.

Unlike the system 500, however, the system 700 includes a memory module 716. The memory module 716 might include an edge connector 714 comprising a plurality of contact pads (not shown), a plurality of memory devices (708), a module board (706), and a C/A buffer (710). The contact pads are typically present at both sides of the board 706. A plurality of receptacles, e.g., sockets 712, is mounted on the motherboard 502. The sockets 712 receive the edge connectors 714 to thereby electrically couple the motherboard 502 to the memory module 716. More particularly, the sockets 712 electrically couple traces routed on the motherboard 502 to traces routed on the module board 706 such that the memory module 716 is coupled to the motherboard 502 and the controller 504.

The memory module 716 includes a plurality of memory devices 708, These memory devices 708 are, for example, DRAM and SDRAM. A buffer 710 controls and buffers commands and addresses it receives from the memory controller 504. The plurality of memory devices 708 and the buffer 710 are mounted onihe module board 706.

In one embodiment, the memory module 716 is positioned farthest from the controller 504. Doing so, eliminates signal reflection because there exists no branch point from signal traces on the motherboard 702. That is, the branch point causes a signal to be transferred in as many directions as points emanating from the branch point, e.g., two or more directions. Undesired signal reflection might occur because of mismatching of a characteristic impedance (Z0) at the branch point.

The signal path between the controller 504 and the memory module 716 extends from the controller 504 to the memory 708 to the memory module 716. Since the memory 708 is soldered directly to the board 706, no signal branch exists at that point and, therefore, no signal reflection. On the other hand, if the memory module 716 is positioned between the controller 504 and memory 708, the connector socket must be located between the signal trace creating a stub or branch from the module trace. This branch will create a signal reflection.

Figure 1:
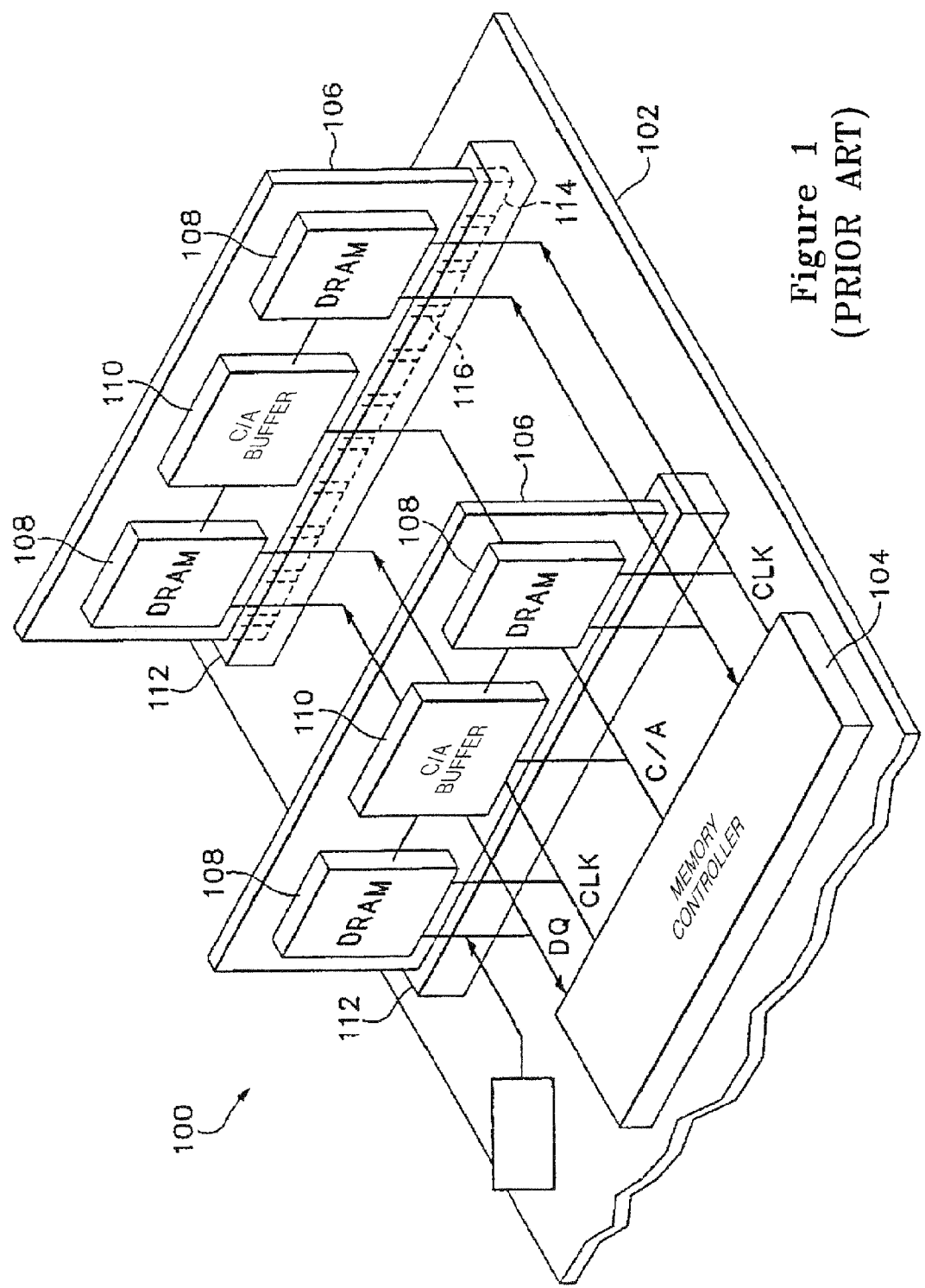
FIG. 1 is a top view of a memory system.
Figure 2:
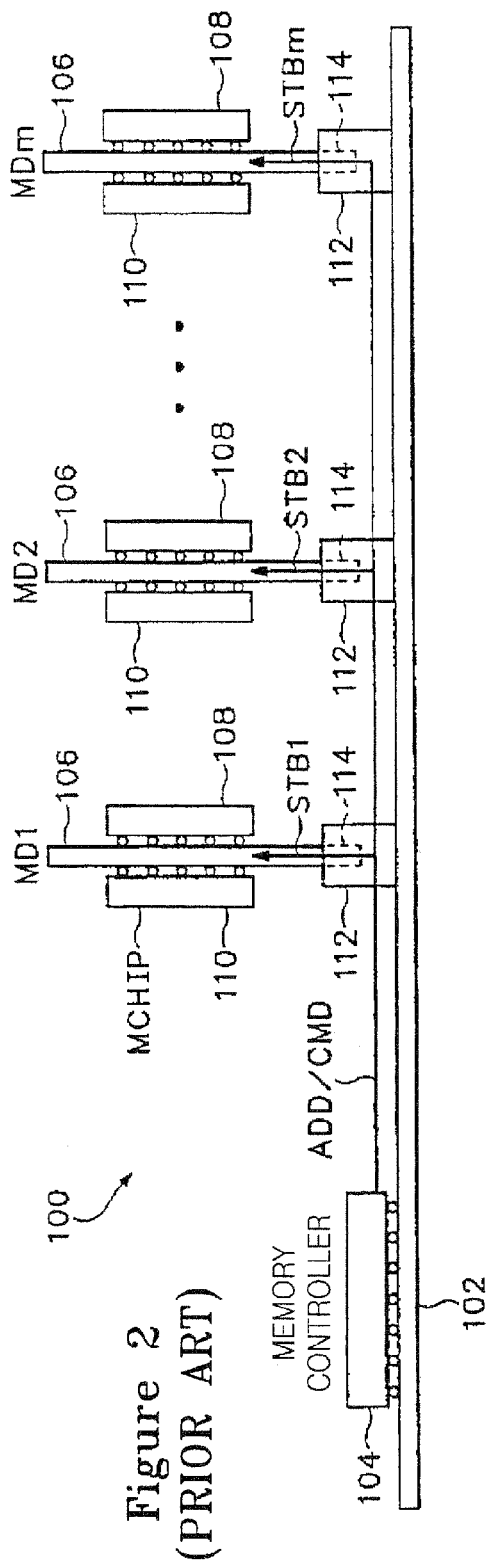
FIG. 2 is a side view of the memory system shown in FIG. 1.
Figure 3:
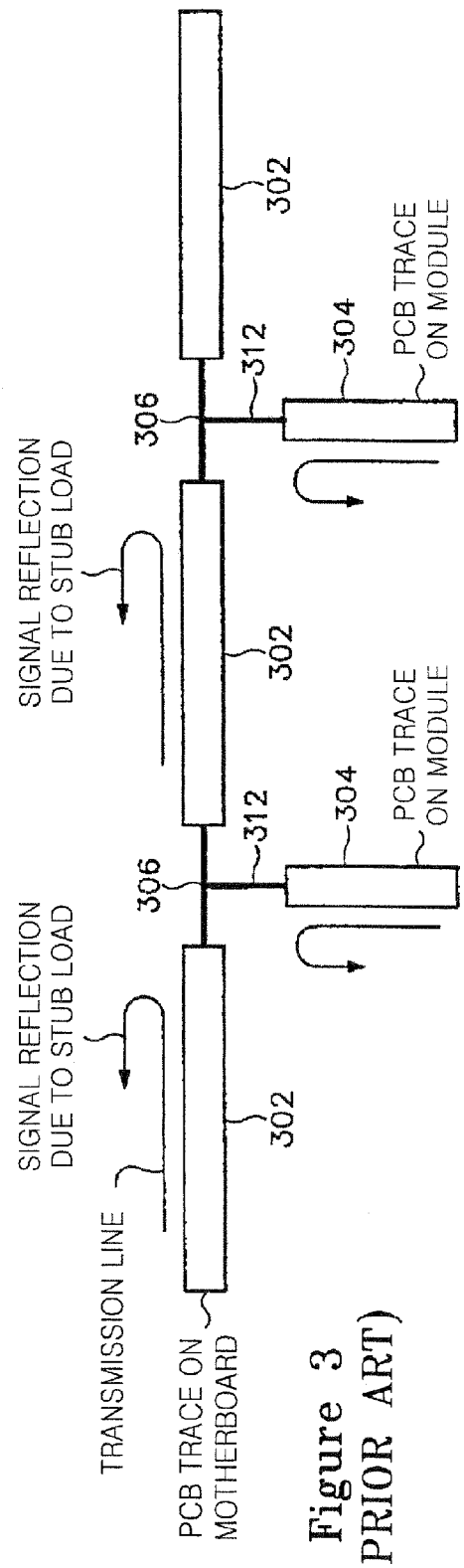
FIG. 3 is a transmission line diagram associated with the system shown in FIG. 1.
Figure 4:
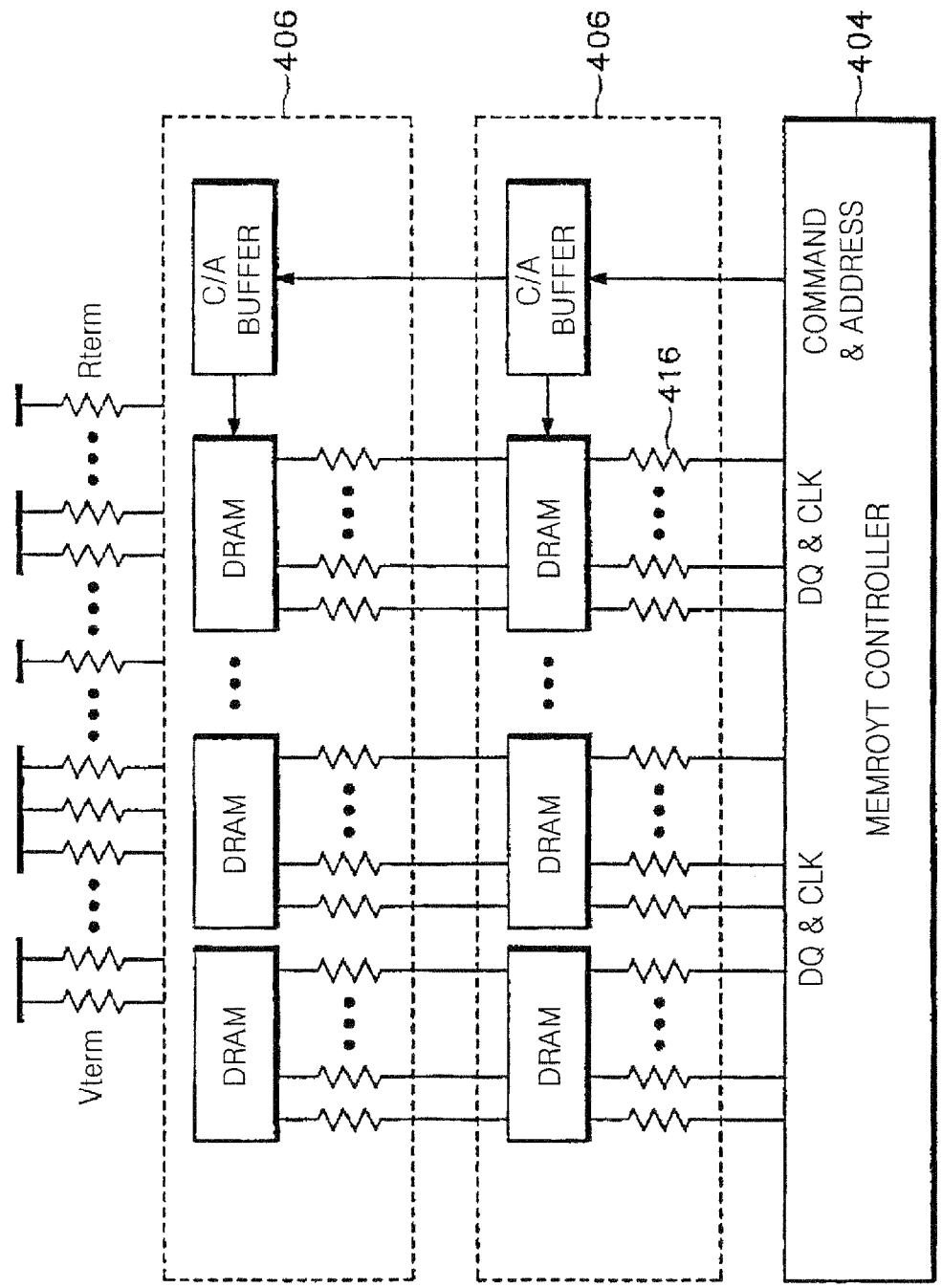
FIG. 4 is a top view of a memory system.
Figure 8:
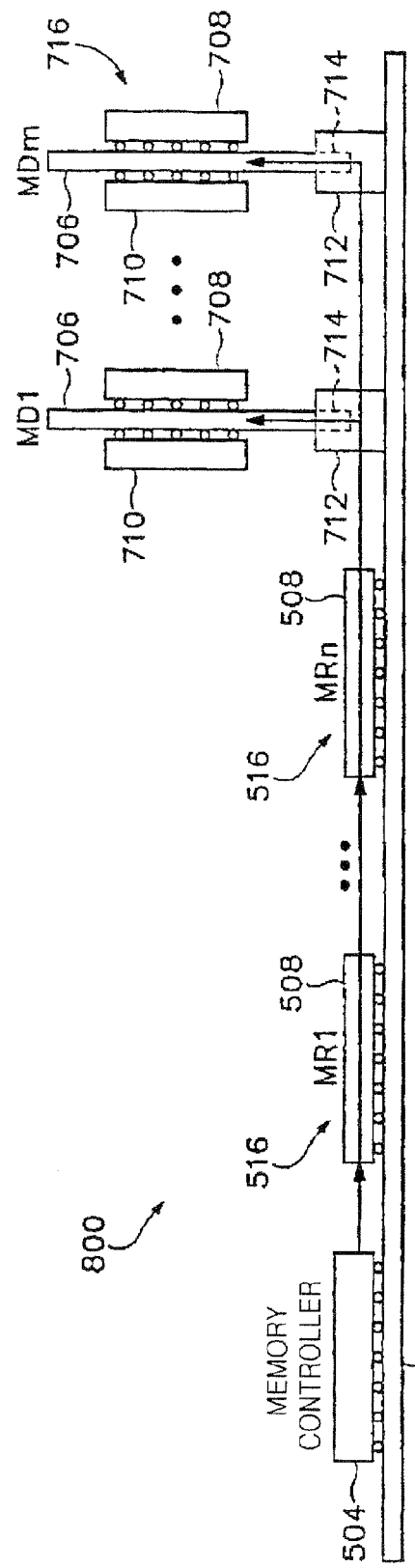
FIG. 8 is a side view of an embodiment of the memory system according to the present invention.

FIG. 8 is a side view of a memory system 800 according to the present invention. The system 800 is substantially similar to the system 700 except that instead of a single memory module 716, the system 800 might include two or more memory modules 716. The system 800 might exhibit some of the disadvantages associated with the system 100 shown in FIG. 1 because a branch points exist from the motherboard 502. This branch point might cause undesired signal reflection that might adversely affect signal integrity. Nonetheless, the system 800 minimizes the signal degradation by mounting the plurality of memory ranks directly on the motherboard 502.

Figure 9:
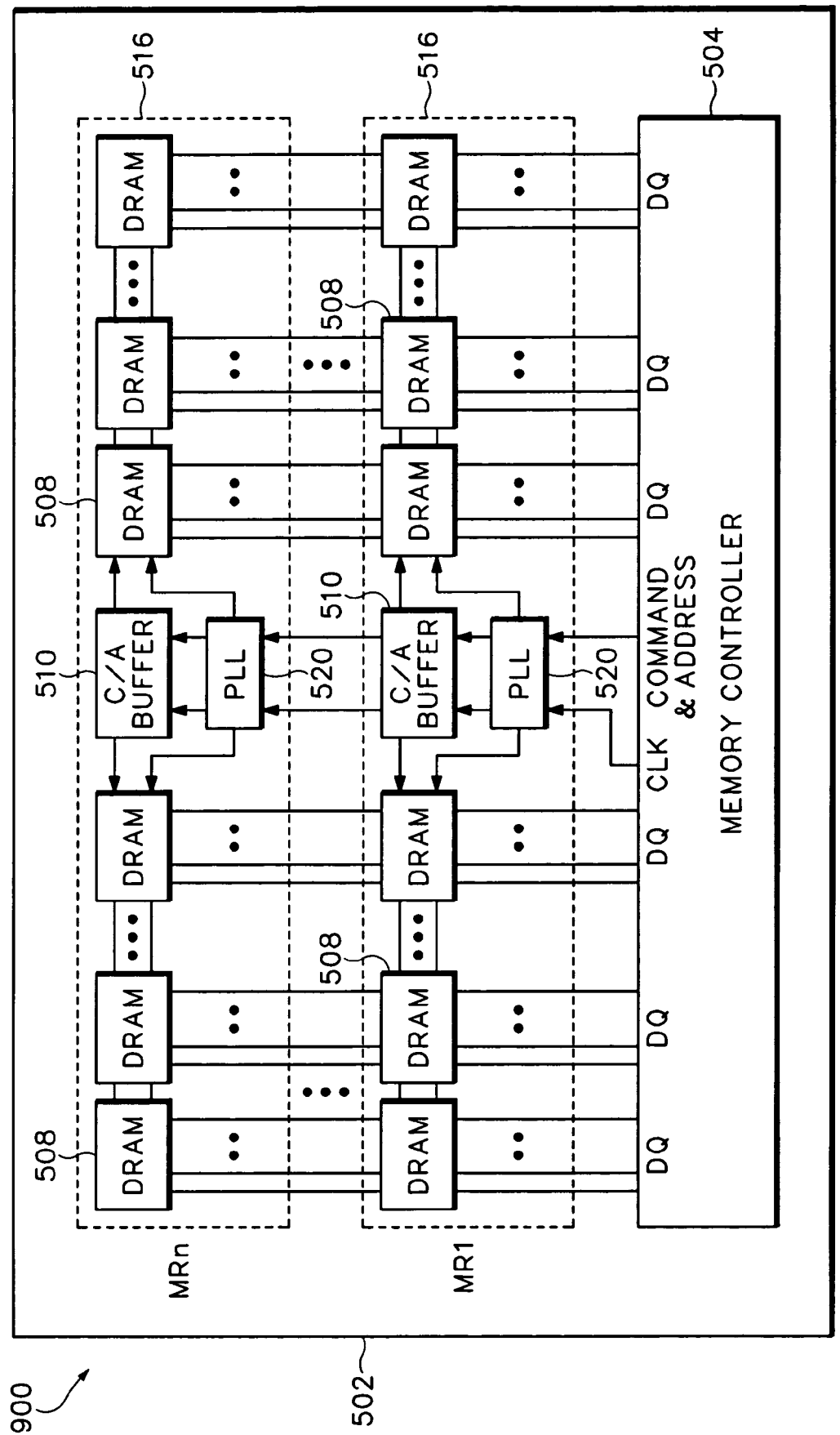
FIG. 9 is a top view of an embodiment of the memory system according to the present invention.

FIG. 9 is a top view of an embodiment of a memory system 900 according to the present invention. The system 900 is substantially similar to the system 500 with the addition of a phase locked loop (PLL) 520 in each memory rank 516. The PLL 520 is capable of generating a first clock 1stCLK responsive to the system clock CLK. The PLL 520 provides the 1stCLK signal to its corresponding memory devices 508. By adding the PLL 520, the system 900 avoids having to route the system clock separately to each memory device 508 from the memory controller 504. In another embodiment, the PLL 520 might likewise be replaced with a delay locked loop (DLL) that operates similarly to the PLL 520. That is, the DLL is capable of generating the 1stCLK responsive the system clock CLK and to provide the 1stCLK to its corresponding memory devices 508.

Figure 10:
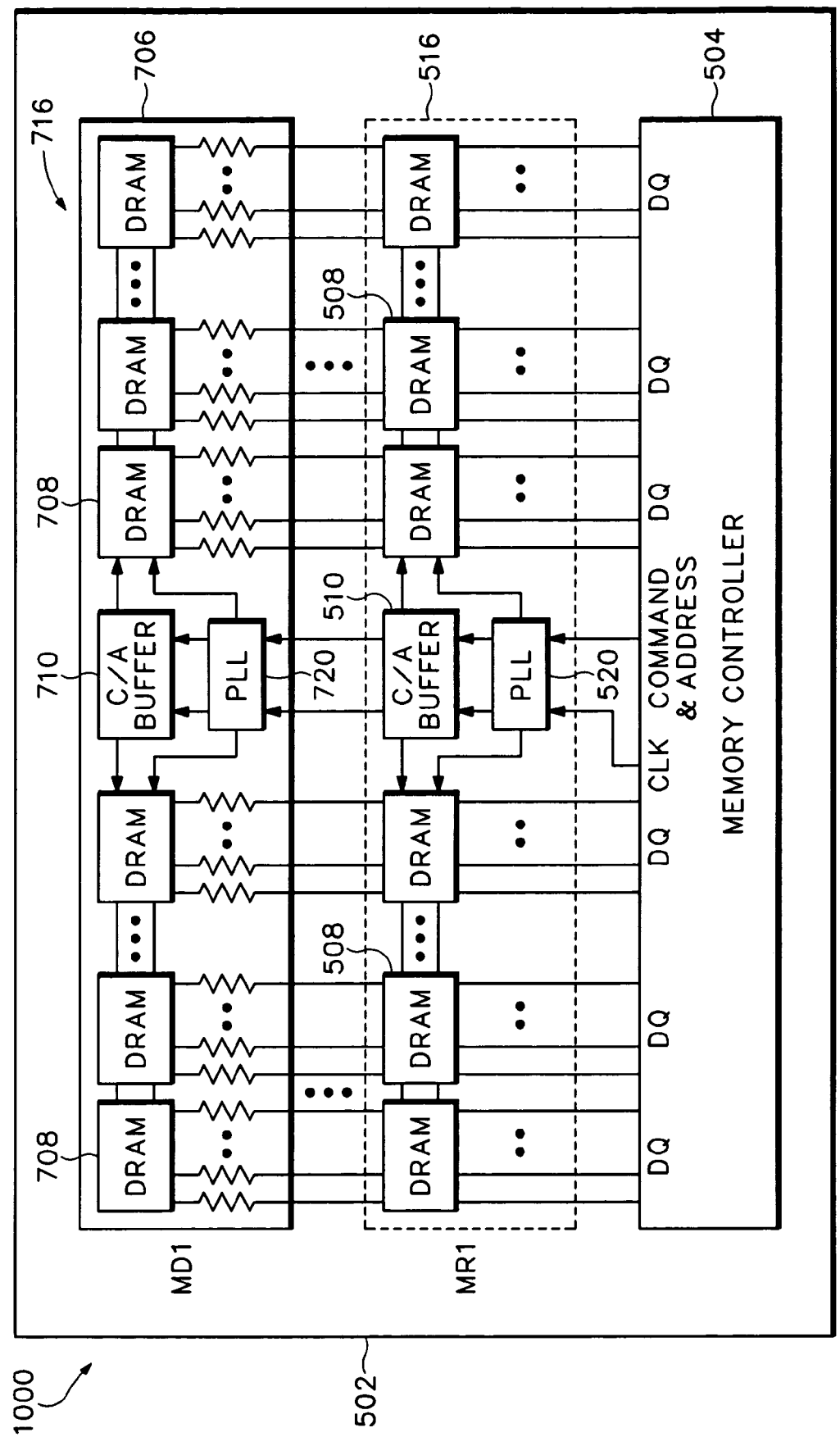
FIG. 10 is a top view of an embodiment of the memory system according to the present invention.

FIG. 10 is a top view of an embodiment of a memory system 1000 according to the present invention. The system 1000 is substantially similar to the system 900 with the addition of a memory module 716. The memory module 716 operates substantially as described earlier with reference to FIG. 7. The memory module 716 includes a PLL 720 that is capable of generating a first clock 1stCLK responsive to the system clock CLK and a module board 706. The PLL 720 provides the 1stCLK signal to its corresponding memory devices 708 on the memory module 716. By adding the PLL 720, the system 1000 avoids having to route the system clock separately to each memory device 508, 708 from the memory controller 504. In another embodiment, the PLL 520, 720 might likewise be replaced with a delay locked loop (DLL) that operates similarly to the PLL 520, 720. That is, the DLL is capable of generating the 1stCLK responsive the system clock CLK and to provide the 1stCLK to its corresponding memory devices 508, 708.

In an embodiment, at least one first memory device 708 receives the command and address signals outputted from the command and address buffer through a second command and address signal trace routed on the motherboard. In an embodiment, the first command and address signal trace is arranged substantially perpendicularly with the second command and address signal trace.

Having illustrated and described the principles of our invention(s), it should be readily apparent to those skilled in the art that the invention(s) can be modified in arrangement and detail without departing from such principles. We claim all modifications coming within the spirit and scope of the accompanying claims.

We claim:

1. A memory system, comprising:
   a first buffer chip directly mounted on a motherboard;
   at least one first memory chip coupled to the first buffer chip and directly mounted on the motherboard; and
   a plurality of signal traces routed on the motherboard to the first buffer chip and the at least one first memory chip;
   where the system eliminates signal reflection caused by signal trace discontinuities of the first buffer chip and the at least one first memory chip by directly mounting the first buffer chip and the at least one first memory chip on the motherboard without an intervening socket.

2. The memory system of claim 1 where the first buffer chip is a command and address buffer capable of driving the at least one first memory chip with address and command signals.

3. The memory system of claim 2 where the command and address buffer receives a command and address signal through a first command and address signal trace routed on the motherboard.

4. The memory system of claim 3
   where the at least one first memory chip receives the command and address signals outputted from the command and address buffer through a second command and address signal trace routed on the motherboard; and
   where the first command and address signal trace is arranged substantially perpendicular to the second command and address signal trace.

5. The memory system of claim 1 where the at least one first memory chip is one of a DRAM and SDRAM.

6. The memory system of claim 1 where the at least one first memory chip receives a data signal and a clock signal through corresponding data and clock signal traces routed on the motherboard.

7. A memory system, comprising:
   at least one memory rank mounted directly on a motherboard; and
   a plurality of signal traces routed on the motherboard to the at least one memory rank;
   where the system eliminates signal reflection caused by signal trace discontinuities between the at least one memory rank and the plurality of signal traces by directly mounting the at least one memory rank on the motherboard.

8. The memory system of claim 7 where the at least one memory rank comprises:
   at least one first memory device; and
   a first buffer capable of driving address and command signals to the at least one first memory device through corresponding signal traces routed on the motherboard.

9. The memory system of claim 8 where the first buffer receives a command and address signal through a first command and address signal trace routed on the motherboard.

10. The memory system of claim 9
    where the at least one first memory device receives the command and address signal outputted from the first buffer through a second command and address signal trace routed on the motherboard; and
    where the first command and address signal trace is arranged substantially perpendicular to the second command and address signal trace.

11. The memory system of claim 9 where the at least one first memory device receives a data signal and a clock signal through corresponding data and clock signal traces routed on the motherboard.

12. The memory system of claim 9 where the at least one first memory device is one of a DRAM and SDRAM.

13. A memory system, comprising:
    a memory controller mounted directly on a motherboard and generating a plurality of command and address signals;
    a first buffer mounted directly on the motherboard and receiving the command and address signals;
    at least one first memory device coupled to the first buffer and mounted directly on the motherboard; and
    a plurality of signal traces routed on the motherboard to the first buffer and the at least one first memory device;
    where the system eliminates signal reflection caused by signal trace discontinuities between the memory controller, the first buffer, the at least one first memory device, and the plurality of signal traces by directly mounting the memory controller, the first buffer, and the at least one first memory device, on the motherboard.

* * * * *

UNITED STATES PATENT AND TRADEMARK OFFICE
CERTIFICATE OF CORRECTION

PATENT NO.        : 7,227,796 B2                                          Page 1 of 1
APPLICATION NO.   : 10/750093
DATED             : June 5, 2007
INVENTOR(S)       : Jung-Bae Lee et al.

It is certified that error appears in the above-identified patent and that said Letters Patent is hereby corrected as shown below:

Column 2, line 67, the words "the 30 memory" should read -- the memory --;
Column 3, line 61, the word "onihe" should read -- on the --.

Signed and Sealed this

Fifth Day of August, 2008

JON W. DUDAS
*Director of the United States Patent and Trademark Office*